US009782730B2

(12) United States Patent
Lu et al.

(10) Patent No.: US 9,782,730 B2
(45) Date of Patent: Oct. 10, 2017

(54) 1234YF- AND 1234ZE-BASED POLYMERIC MEMBRANE MATERIALS, MEMBRANE PREPARATIONS AND USES THEREOF

(71) Applicant: Honeywell International, Inc., Morristown, NJ (US)

(72) Inventors: Changqing Lu, Snyder, NY (US); Andrew J. Poss, Kenmore, NY (US); Rajiv R. Singh, Getzville, NY (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/264,093

(22) Filed: Apr. 29, 2014

(65) Prior Publication Data

US 2014/0339167 A1 Nov. 20, 2014

Related U.S. Application Data

(60) Provisional application No. 61/823,199, filed on May 14, 2013.

(51) Int. Cl.
*B01D 71/32* (2006.01)
*B01D 69/08* (2006.01)
*B01D 67/00* (2006.01)

(52) U.S. Cl.
CPC .......... *B01D 71/32* (2013.01); *B01D 67/0011* (2013.01); *B01D 69/087* (2013.01); *B01D 2325/24* (2013.01); *B01D 2325/28* (2013.01); *B01D 2325/30* (2013.01)

(58) Field of Classification Search
CPC ........ B01D 63/00; B01D 71/06; B01D 53/22; B01D 61/36
USPC ............................................. 210/651, 500.21
See application file for complete search history.

(56) References Cited

U.S. PATENT DOCUMENTS

| 2,970,988 | A | * | 2/1961 | Lo | ......................... C08F 214/18 526/249 |
| 3,085,996 | A | * | 4/1963 | Lo | ......................... C08F 214/18 526/195 |
| 4,775,703 | A | * | 10/1988 | Susa | ................... B01D 67/0011 521/145 |
| 4,944,775 | A | | 7/1990 | Hayes | |
| 5,032,274 | A | | 7/1991 | Yen et al. | |
| 5,156,656 | A | | 10/1992 | Parker et al. | |
| 5,286,324 | A | | 2/1994 | Kawai et al. | |
| 5,387,378 | A | | 2/1995 | Pintauro et al. | |
| 5,445,739 | A | | 8/1995 | Fujimoto et al. | |
| 5,489,406 | A | * | 2/1996 | Beck | ................... B01D 67/0011 264/209.1 |
| 5,779,897 | A | * | 7/1998 | Kalthod et al. | ............. 210/321.8 |
| 6,074,718 | A | | 6/2000 | Puglia et al. | |
| 6,146,747 | A | * | 11/2000 | Wang | ................... B01D 39/083 210/490 |
| 6,406,517 | B1 | | 6/2002 | Avery et al. | |
| 6,569,341 | B2 | | 5/2003 | Bowser | |
| 6,726,840 | B1 | | 4/2004 | Arcella et al. | |
| 6,802,973 | B2 | | 10/2004 | Cheng et al. | |
| 6,977,043 | B2 | | 12/2005 | Cheng et al. | |
| 7,291,204 | B2 | | 11/2007 | Suzuki et al. | |
| 8,163,858 | B2 | * | 4/2012 | Samuels | ............... B60C 1/0008 526/249 |
| 2003/0141238 | A1 | | 7/2003 | Herczeg | |
| 2004/0043224 | A1 | * | 3/2004 | Sternberg | .............. A61M 5/165 428/421 |
| 2004/0198121 | A1 | * | 10/2004 | Huang et al. | .................. 442/290 |
| 2005/0155926 | A1 | | 7/2005 | Kim et al. | |
| 2008/0153977 | A1 | * | 6/2008 | Samuels et al. | ................. 525/53 |
| 2008/0171844 | A1 | * | 7/2008 | Samuels | ............... B60C 1/0008 526/255 |
| 2009/0277837 | A1 | | 11/2009 | Liu et al. | |
| 2010/0143611 | A1 | | 6/2010 | Hutchinson et al. | |
| 2011/0017661 | A1 | | 1/2011 | Kosar | |
| 2011/0097529 | A1 | * | 4/2011 | Durali et al. | ................. 428/36.9 |
| 2012/0065435 | A1 | * | 3/2012 | Nishiguchi et al. | .......... 570/164 |
| 2012/0085698 | A1 | | 4/2012 | Yang et al. | |
| 2012/0234745 | A1 | | 9/2012 | Jerman et al. | |
| 2013/0312604 | A1 | | 11/2013 | Amin-Sanayei et al. | |
| 2014/0138314 | A1 | * | 5/2014 | Liu | .................... B01D 67/0018 210/650 |

(Continued)

FOREIGN PATENT DOCUMENTS

| IT | GB 1281976 | * 7/1972 | ................. 210/500.2 |
| WO | 00/29093 | 5/2000 | |
| WO | 2012-112840 | 8/2012 | |
| WO | 2012/112840 | 8/2012 | |
| WO | WO 2012112840 | * 8/2012 | |
| WO | 2012128939 | 9/2012 | |

OTHER PUBLICATIONS

Chung-Hao Yu, PTFE/polyamide thin-film composite membranes using PTFE films modified with ethylene diamine polymer and interfacial polymerization: Preparation and pervaporation application, (2009) 260-267.*

(Continued)

*Primary Examiner* — Krishnan S Menon
*Assistant Examiner* — Waqaas Ali
(74) *Attorney, Agent, or Firm* — Bruce O. Bradford

(57) ABSTRACT

The present invention generally relates to polymeric membrane materials formed, at least in part, from monomeric material selected from 2,3,3,3-tetrafluoropropene ($CF_3CF=CH_2$, HFO-1234yf) or trans-1,3,3,3-tetrafluoropropene ($CF_3CH=CFH$, HFO-1234ze), and to membrane preparations and uses thereof in water desalination, filtration, membrane distillation, pervaporation, and selective gas separation.

11 Claims, No Drawings

(56) References Cited

U.S. PATENT DOCUMENTS

2014/0138317 A1* 5/2014 Liu .................. B01D 71/32
                                                    210/651

OTHER PUBLICATIONS

J Mater Sci: Mater Med (2006) 17:1057-1062.
Ind. Eng. Chem. Res. 2009, 48, 4638-4663.
U.S. Appl. No. 13/679,251 [Not Yet Published].

* cited by examiner

1234YF- AND 1234ZE-BASED POLYMERIC MEMBRANE MATERIALS, MEMBRANE PREPARATIONS AND USES THEREOF

CROSS-REFERENCE TO RELATED APPLICATION

This application claims domestic priority from commonly owned U.S. Provisional Application Ser. No. 61/823,199 filed 14 May 2013, the disclosure of which is hereby incorporated herein by reference.

FIELD OF THE INVENTION

The present invention generally relates to polymeric membrane materials formed, at least in part, from monomeric material comprising 2,3,3,3-tetrafluoropropene ($CF_3CF=CH_2$, HFO-1234yf) or trans-1,3,3,3-tetrafluoropropene ($CF_3CH=CFH$, HFO-1234ze), and to membrane preparations and uses thereof in water desalination, filtration, membrane distillation, pervaporation, and selective gas separations.

BACKGROUND OF THE INVENTION

Membrane-based technologies have the advantages of both low capital cost and high energy efficiency as compared to much older and established techniques such as cryogenic distillation, absorption, and adsorption. Membrane-based separation processes are widely adopted today in petrochemical, electronic, environmental, food, pharmaceutical, and biotechnology industries. For example, reverse osmosis (RO), has been successfully used for seawater desalination to meet freshwater demand in many regions of the world at low cost and minimum environmental impact. Other membrane-based filtration processes, such as microfiltration (MF), ultrafiltration (UF), and nanofiltration (NF), have similarly been successfully used in water treatment and purification. Furthermore, membrane distillation (MD) and pervaporation (PV) are emerging as new technologies for separations of greater difficulty. Finally, membrane-based selective gas separations are of special interest to petroleum producers and refiners, chemical companies, and industrial gas suppliers. Several applications of membrane-based selective gas separations have achieved commercial success, including nitrogen enrichment from air, carbon dioxide removal from hydrocarbons (e.g., from natural gas and enhanced oil recovery), and also in hydrogen removal from nitrogen, methane, and argon in ammonia purge gas streams.

Polymeric membrane materials provide a range of properties including low cost, permeability, mechanical stability, and ease of processability that are important for liquid, vapor, or gas separations. For example, several polymeric membrane materials have been used in reverse osmosis desalination and water filtration, such as cellulose acetate, polysulfone coated with aromatic polyamides, poly(vinylidene fluoride), poly(acrylonitrile-vinyl chloride), etc. However, these polymeric materials have certain disadvantages and limitations. For example, cellulose acetate membranes are susceptible to microbiological attack and limited to a relatively narrow feed pH range. As an additional example, polyamide membranes have poor resistance to continual exposure to oxidizing agents such as chlorine (i.e., have low chlorine tolerance).

Fouling is another major problem in membrane applications. In general, fouling occurs either on the surface of a membrane or within its pores, and it causes a decrease in flux. Fouling is especially a challenge in reverse osmosis (RO) operations, as up to 10-15% of operational time may be spent on RO membrane cleaning. Furthermore, due to fouling, RO performance is lost over time, harsh cleaning shortens membrane life span, and increased operating cost is required to maintain productivity.

Other fouling controls in membrane operations include complex steps such as: (1) increasing hydrophilicity of membranes by grafting hydrophilic polymer chains on PVDF or polyamide; (2) incorporating silver/copper nanoparticles on the surface of the membranes; and/or (3) using electrically charged polymer nanocomposite membranes. Unfortunately, such control is often quite expensive and/or not long lasting. Furthermore, while fouling can be controlled to some extent by adding disinfectants, anti-scaling agents, and other pretreatment steps, such is merely a remedy, and does not present a permanent solution to fouling problems.

SUMMARY OF THE INVENTION

It has been found that compared to conventional polymeric membrane materials, 1234yf- or 1234ze-based polymers (poly-1234yf or poly-1234ze which, in a broad sense, includes both its homopolymers and copolymers) have certain advantages, such as good mechanical strength, flexibility, processability, and resistance to fouling. For example, poly-1234yf and poly-1234ze have sufficient solubility in commonly used organic solvents, which is helpful for membrane fabrication. Poly-1234yf and poly-1234ze membranes can also be made with smooth surfaces and optimal surface energy to reduce bio-fouling. Poly-1234yf and poly-1234ze also possess high hydrophobicity—similar to PTFE—which is required for some membrane distillation processes. Poly-1234yf or poly-1234ze membrane materials are highly resistant to plasticization and to the attack by chlorine.

In accordance with a first aspect of the present invention, poly-1234yf and poly-1234ze membrane materials are provided.

In accordance with a second aspect of the present invention, methods of making poly-1234yf and poly-1234ze membrane materials are provided.

In accordance with a third aspect of the present invention, applications are provided in reverse osmosis desalination, water filtration, membrane distillation, pervaporation, and selective gas separations which are useful commercially.

It should be appreciated by those persons having ordinary skill in the art to which the present invention relates that any of the features described herein in respect of any particular aspect and/or embodiment of the present invention can be combined with one or more of any of the other features of any other aspects and/or embodiments of the present invention described herein, with modifications as appropriate to ensure compatibility of the combinations. Such combinations are considered to be part of the present invention contemplated by this disclosure.

It is to be understood that both the foregoing general description and the following detailed description are exemplary and explanatory only and are not restrictive of the invention as claimed. Other embodiments will be apparent to those skilled in the art from consideration of the specification and practice of the invention disclosed herein.

DETAILED DESCRIPTION OF THE INVENTION

It is contemplated that the polymeric materials according to the present invention may be formed using one or a combination of different techniques known in the art. In certain preferred embodiments, poly-1234yf or poly-1234ze is formed using one or a combination of several preferred techniques, including, (1) emulsion polymerization; (2) suspension polymerization; (3) solution polymerization; (4) supercritical carbon dioxide polymerization; (5) metal complex catalyzed stereoselective polymerization, and combinations thereof.

A detailed description of a preferred method of production is disclosed in U.S. Provisional Application Ser. No. 61/543,714, which is incorporated herein by reference. See also, U.S. Patent Pub. Nos. 2013-0090439 and 2013-0089671.

In a first embodiment of the present invention, a polymeric membrane material comprises polymerized monomers of at least 2,3,3,3-tetrafluoropropene (1234yf) or trans-1,3,3,3-tetrafluoropropene (1234ze). The fluoropolymer may be provided as a homopolymer of 1234yf or 1234ze or may be a copolymer comprising one or more co-monomers. The co-monomers may be any halogenated or non-halogenated monomers described herein or otherwise known in the art. In certain aspects, the halogenated monomer is a halogenated alkene, preferably a halogenated ethylene or propylene. Examples of such co-monomers include, but are not limited to, hexafluoropropylene, tetrafluoroethylene, trifluoroethylene, chlorotrifluoroethylene, vinylidene fluoride, vinylidene chloride, vinyl fluoride, or combinations thereof. In further aspects, the non-halogenated co-monomers may be comprised of ethylene, propylene, acrylic acid, acrylate or methacrylate ester, acrylamide, vinyl alcohol, vinyl silane, butyl vinyl ether, cyclohexyl vinyl ether, N-vinyl-2-pyrrolidinone, vinyl acetate, vinyl propionate, and the like, or combinations thereof.

In embodiments where 1234yf or 1234ze is copolymerized with one or more second co-monomers, 1234yf or 1234ze may be provided in an amount between about 1 and about 99 weight percent and the co-monomer(s), individually or collectively, may be between about 1 and about 99 weight percent. In further preferred embodiments, 1234yf or 1234ze is provided in an amount between about 10 and about 90 weight percent and the co-monomer(s), individually or collectively, may be between about 10 and about 90 weight percent. In even further embodiments, 1234yf or 1234ze is provided in an amount between about 30 and about 70 weight percent and the co-monomer(s), individually or collectively, may be between about 30 and about 70 weight percent. In even further embodiments, 1234yf or 1234ze is provided in an amount at or greater than about 50 weight percent and the co-monomer(s), individually or collectively, may be in an amount at or less than about 50 weight percent.

The poly-1234yf or poly-1234ze can be dissolved in an organic solvent or mixture of solvents to form a membrane casting solution or a coating solution. Examples of such solvents include, but are not limited to, N,N-dimethylformamide, N-methyl-2-pyrrolidone, N,N-dimethylacetamide, dimethyl sulfoxide, ethyl acetate, acetone, methyl ethyl ketone, tetrahydrofuran, 1,3-dioxolane, 1,1,1,3,3-pentafluorobutane, and the like. The amount of solvent or solvents used to form the membrane casting solution can be varied such that the poly-1234yf or poly-1234ze concentration can range from about 10 to about 40 weight percent, in certain preferred embodiments from about 20 to about 30 weight percent. The amount of solvent or solvents used to form the membrane coating solution can be varied such that the poly-1234yf or poly-1234ze concentration can range from about 0.5 to about 20 weight percent, in certain preferred embodiments from about 1 to about 10 weight percent.

The membrane composition may, optionally, include one or more additives. Non-limiting examples of such additives may be selected from the group consisting of molecular sieves, zeolites, silica particles, and the like, or combinations thereof. Additional or specific additives are provided herein or will be readily apparent to the skilled artisan on the basis of the disclosure herein.

Poly-1234yf or poly-1234ze membranes can be fabricated in both flat sheet and hollow fiber configurations. Flat sheet membranes can be asymmetric integrally skinned membranes manufactured from a casting dope by a dry-wet phase inversion process. Asymmetric integrally skinned flat sheet membranes have a thin, dense, nonporous selective skin layer that performs the separation, supported on a highly porous substrate layer made from the same material.

Flat sheet membranes can also be thin film composite (TFC) membranes made by lamination or dip coating techniques. TFC membranes comprise a thin, dense, nonporous selective layer that performs the separation and a highly porous substrate layer made separately from a different material.

As with flat sheet membranes, hollow fiber membranes can be either asymmetric integrally skinned or TFC membranes. Hollow fiber membranes preferably have high membrane area and are self-supporting membranes.

It is contemplated that the polymeric membranes of the present invention will find utility and/or exhibit advantages in all separation applications in which conventionally used polymeric membranes have been applied. In certain highly preferred embodiments, the fluoropolymer membranes comprising poly-1234yf or poly-1234ze can be used in reverse osmosis desalination, microfiltration, ultrafiltration, nanofiltration, membrane distillation, pervaporation, and selective gas separation.

Additional advantages, compositions, uses and associated fabrication methods of polymeric membranes comprising poly-1234yf or poly-1234ze will be readily apparent to skilled artisans on the basis of the disclosure provided herein.

The following examples provide additional details regarding various embodiments of the present invention.

EXAMPLES

Example 1

Synthesis of 1234yf/VDF Copolymer

Into 100 mL of degassed deionized water with stirring, 2.112 g of $Na_2HPO_4.7H_2O$, 0.574 g of $NaH_2PO_4$, and 2.014 g of $C_7F_{15}CO_2NH_4$ were added. 0.307 g of $(NH_4)_2S_2O_8$ was added into above aqueous emulsion with stirring and nitrogen bubbling. The obtained aqueous emulsion was immediately transferred into an evacuated 300 mL autoclave reactor through a syringe. The reactor was cooled with dry ice while the aqueous emulsion inside was slowly stirred. When the internal temperature decreased to about 0° C., the transfer of a mixture of 2,3,3,3-tetrafluoropropene (111.3 g) and vinylidene fluoride (11.8 g) was started. At the end of the transfer, the internal temperature was below about −5° C. The dry ice cooling was removed. The autoclave reactor was slowly warmed up in air. The aqueous emulsion inside was stirred at 500 rpm.

When the internal temperature increased to about 15° C., 0.294 g of $Na_2S_2O_5$ dissolved in 5 mL degassed deionized water was pumped into the autoclave reactor. The autoclave reactor was slowly heated up to 35° C. The initial internal pressure was 189 psi. After 90 hours of polymerization, the stirring became difficult, the temperature drifted to 44° C., and the internal pressure dropped to 162 psi. At this point, the heating and stirring were then stopped, and the autoclave reactor was cooled down in air. Then, at room temperature, the residual pressure was slowly released. The white solid polymer precipitate surrounding the stirrer was taken out and crushed into small pieces. The copolymer was thoroughly washed with deionized water and dried under vacuum (29 in. Hg) at 35° C. to dryness. The dried copolymer weighed 71.3 g to give a yield of 57.9%.

The actual monomer unit ratio in the copolymer determined by $^{19}$F NMR was 91.1 mol % of 2,3,3,3-tetrafluoropropene and 8.9 mol % of vinylidene fluoride. The weight average molecular weight of the copolymer measured by GPC included 779,780 (major) and 31,832 (minor). The coating film of the copolymer (by solution casting on aluminum substrate) gave a water contact angle of 96.9°, a diiodomethane contact angle of 77.2°, and a corresponding surface energy of 21.6 mJ/m$^2$, which is within the range of the optimal surface energy for biofouling resistance in marine environments. See J Mater Sci: Mater Med (2006) 17:1057-1062.

Example 2

Synthesis of 1234ze/VDF Copolymer

Into 100 mL of degassed deionized water with stirring, 2.128 g of Na$_2$HPO$_4$.7H$_2$O, 0.587 g of NaH$_2$PO$_4$, and 2.100 g of C$_7$F$_{15}$CO$_2$NH$_4$ were added. 0.315 g of (NH$_4$)$_2$S$_2$O$_8$ was then added into the above aqueous emulsion with stirring and nitrogen bubbling. The obtained aqueous emulsion was immediately transferred into an evacuated 300 mL autoclave reactor through a syringe. The autoclave reactor was cooled with dry ice, while the aqueous emulsion inside was slowly stirred. When the internal temperature decreased to about −3° C., the transfer of a mixture containing trans-1,3,3,3-tetrafluoropropene (90.1 g) and vinylidene fluoride (36.7 g) was started. At the end of the transfer, the internal temperature was below about −5° C. The dry ice cooling was removed. The autoclave reactor was slowly warmed up in air. The aqueous emulsion inside was stirred at 300 rpm.

When the internal temperature increased to about 0° C., 0.298 g of Na$_2$S$_2$O$_5$ dissolved in 3 mL degassed deionized water was pumped into the autoclave reactor, followed by 2 mL degassed deionized water to rinse the pumping system. The stir rate was increased to 500 rpm. The autoclave reactor was slowly heated up to 35° C. The initial internal pressure was 316 psi.

After 18 hours, the internal pressure was 238 psi at 35° C. The heating was stopped. The autoclave reactor was cooled down with dry ice. The stir rate was decreased to 300 rpm. When the internal temperature decreased to about 0° C., 0.331 g of (NH$_4$)$_2$S$_2$O$_8$ dissolved in 3 ml degassed deionized water was pumped into the autoclave reactor, followed by 2 mL degassed deionized water to rinse the pumping system. The dry ice cooling was then removed. The autoclave reactor was slowly warmed up in air. When the internal temperature increased to about 10° C., 0.312 g of Na$_2$S$_2$O$_5$ dissolved in 3 mL degassed deionized water was pumped into the autoclave reactor, followed by 2 mL degassed deionized water to rinse the pumping system. The stir rate was increased to 500 rpm. The autoclave reactor was slowly heated up to 35° C. The internal pressure was 219 psi at this time. The copolymerization was resumed.

After another 68 hours, the internal pressure decreased to 158 psi at 35° C. The heating was stopped. At room temperature, the residual pressure was slowly released. The emulsion mixture was filtered. The filtrate (latex) was acidified with conc. hydrochloric acid to precipitate the copolymer out. The copolymer was thoroughly washed with deionized water and dried under vacuum (28 in. Hg) at 3° C. to dryness. The dry copolymer weighed 70.3 g to give a polymerization yield of 55.4%.

The actual monomer unit ratio in the copolymer determined by $^{19}$F NMR was 35.2 mol % of trans-1,3,3,3-tetrafluoropropene and 64.8 mol % of vinylidene fluoride. The weight average molecular weight of the copolymer measured by GPC was 384,540. The coating film of the copolymer (by solution casting on aluminum substrate) gave a water contact angle of 96.6°, a diiodomethane contact angle of 73.4°, and a corresponding surface energy of 23.3 mJ/m$^2$, which is in the range of optimal surface energy for biofouling resistance in marine environments. See J Mater Sci: Mater Med (2006) 17:1057-1062.

Example 3

Preparation of 1234yf/VDF Copolymer Asymmetric Integrally Skinned Flat Sheet Membrane This example is presented to illustrate the preparation of 1234yf/VDF copolymer asymmetric integrally skinned flat sheet membrane which has a thin, dense, nonporous selective skin layer that performs the separation, supported on a highly porous substrate layer made from the same material.

6.2 g of 1234yf/VDF copolymer is dissolved in 22.1 g of N,N-dimethylacetamide (DMAc) to form a casting dope. The casting dope is cast on a glass plate to form a membrane having an initial thickness of 0.20 mm. After 10 seconds in air (25° C. and 65% humidity), the membrane is immersed into ice water for 5 minutes, and then water at room temperature for 24 hours.

The water-wet membrane is dried at 45° C. with slow air flow for 24 hours to obtain 1234yf/VDF copolymer asymmetric integrally skinned flat sheet membrane.

Variation of the above preparation parameters results in poly-1234yf/VDF asymmetric integrally skinned flat sheet membranes with different structures, suitable for water desalination, filtration, membrane distillation, pervaporation, and selective gas separation.

Example 4

Preparation of 1234ze/VDF Copolymer Thin Film Composite Flat Sheet Membrane

This example is presented to illustrate the preparation of a thin film composite (TFC) flat sheet membrane using dip coating technique. The TFC flat sheet membrane has 1234ze/VDF copolymer as a nonporous selective layer and a highly porous substrate layer made separately from a different material, PVDF.

The porous PVDF substrate layer is prepared by phase inversion method using DMF as a solvent and water as a non-solvent.

2.1 g of 1234ze/VDF copolymer is dissolved in 98.6 g of ethyl acetate to form a dip coating solution. The porous PVDF substrate layer attached to a glass plate is immersed into the dip coating solution, and then taken out immediately. The 1234ze/VDF copolymer coated porous PVDF substrate layer is left in air overnight, and then dried under vacuum at 80° C. for 24 hours to obtain the corresponding thin film composite flat sheet membrane.

Variation of the above preparation parameters results in poly-1234ze/VDF thin film composite flat sheet membranes with different structures, suitable for water desalination, filtration, membrane distillation, pervaporation, and selective gas separation.

Example 5

Preparation of 1234yf/VDF Copolymer Asymmetric Integrally Skinned Hollow Fiber Membrane This example is presented to illustrate the preparation of 1234yf/VDF copolymer asymmetric integrally skinned hollow fiber membrane.

20.8 g of 1234yf/VDF copolymer is dissolved in 68.2 g of N,N-dimethyl acetamide (DMAc) containing 9.6 g of 1,3-dioxolane and 3.1 g of methanol to form a hollow fiber spinning dope. The spinning dope is extruded at a flow rate of 2.3 mL/min through a spinneret at 45° C. spinning temperature. A bore fluid containing 10% by weight of water in DMAc is injected to the bore of the fiber at a flow rate of 1.0 mL/min simultaneously with extruding of the spinning dope. The nascent fiber travels through an air gap length of 5 cm at room temperature with a humidity of 30%, and then is immersed into a water coagulant bath at 22° C. and wound up at a rate of 6.0 m/min. The water-wet fiber is annealed in a hot water bath at 45° C. for 50 minutes. The annealed water-wet fiber is then sequentially exchanged with methanol for three times and for 30 minutes each time, followed by drying at 45° C. in an oven for 8 hours to form 1234yf/VDF copolymer hollow fiber membrane.

Variation of the above preparation parameters results in poly-1234yf/VDF hollow fiber membranes with different structures, suitable for water desalination, filtration, membrane distillation, pervaporation, and selective gas separation.

Example 6

Preparation of 1234ze/VDF Copolymer Porous Flat Sheet Membrane

This example is presented to illustrate the preparation of 1234ze/VDF copolymer porous flat sheet membrane.

5.3 g of 1234ze/VDF copolymer is dissolved in 26.8 g of N,N-dimethylacetamide (DMAc) containing 0.3 g of lithium bromide to form a casting dope. The casting dope is cast on a glass plate to form a membrane having an initial thickness of 0.20 mm. Immediately after casting, the membrane is immersed into ice water for 10 minutes, and then water at room temperature for 24 hours.

The water-wet membrane is dried at 50° C. with slow air flow for 24 hours to obtain 1234ze/VDF copolymer porous flat sheet membrane.

Variation of the above preparation parameters results in poly-1234ze/VDF porous flat sheet membranes with different structures, suitable for filtration, membrane distillation, and pervaporation.

In accordance with the examples above, membranes may be produced which are suitable for use with the following membrane processes.

(1) Reverse Osmosis (RO)

1234yf/VDF or 1234ze/VDF polymeric membrane materials with smooth surface have adjustable surface energy between about 20 and about 30 mJ/m$^2$, which is within the range of the optimal surface energy for biofouling resistance in marine environment. See J Mater Sci: Mater Med (2006) 17:1057-1062. In addition, 1234yf/VDF or 1234ze/VDF polymeric materials are stable within a wide range of pH, especially in acidic environments, which is desirable for RO separations. In addition, 1234yf/VDF or 1234ze/VDF polymeric materials are also resistant to microbiological attack and chlorine oxidation.

Optionally, 1234yf/VDF or 1234ze/VDF polymeric membrane materials may be provided with increased hydrophilicity to increase water uptake and RO permeation flux.

(2) Microfiltration (MF), Ultrafiltration (UF), and Nanofiltration (NF)

Over the last ten years, PVDF has commonplace for use in microfiltration (MF) and ultrafiltration (UF). However, as compared to PVDF, poly-1234yf and poly-1234ze membrane materials have a more desirable surface energy level to reduce bio-fouling. Poly-1234yf and poly-1234ze membrane materials also have sufficient solubility in commonly used organic solvents, which is useful for membrane fabrication. Fabrication parameters may be varied to result in poly-1234yf or poly-1234ze membranes having different structures, suitable for microfiltration, ultrafiltration, or nanofiltration.

(3) Membrane Distillation (MD)

Membrane distillation (MD) requires high hydrophobicity of membrane materials. Commercially available PTFE is usually a choice; however, the solubility of PTFE is an issue in membrane fabrications. Poly-1234yf or poly-1234ze has very similar surface energy to that of PTFE. In addition, poly-1234yf or poly-1234ze is soluble in a variety of organic solvents, which presents an advantage over PTFE for membrane fabrication.

(4) Pervaporation (PV)

Pervaporation is the only membrane process where permeating substances change their phase. For example, polydimethylsiloxane and polyoctylmethylsiloxane are rubbery membrane materials and permeable for organics (i.e., organophilic). Pervaporation by polydimethylsiloxane or polyoctylmethylsiloxane membranes are used for the separation of organics from water, such as in the recovery of flavors in food industries and in wastewater treatment. In contrast, poly-1234yf and poly-1234ze are hydrophobic glassy polymers at ambient temperatures, which are expected to open up new areas for organic separations.

(5) Selective Gas Separation

One important application of fluoropolymers is in the area of selective gas separations. Commercial examples in this field include TEFLON AF 2400 and AF 1600, HYFLON AD 80 and AD 60, and CYTOP. See Ind. Eng. Chem. Res. 2009, 48, 4638-4663. In $CO_2/CH_4$ separations, these fluoropolymers demonstrate high $CO_2$ permeability, but relatively low $CO_2/CH_4$ selectivity. Recently, 1234yf/VDF polymeric materials have showed good separation properties for several gas pairs. It is noted that International Publication No. WO 2012/112840 demonstrates good selectivities in $O_2/N_2$ and $CO_2/N_2$ separations using polymeric membranes made of 2,3,3,3-tetrafluoropropene/vinylidene fluoride copolymers having VDF as the major monomer unit. In contrast, high molecular weight 2,3,3,3-tetrafluoropropene/vinylidene fluoride copolymers having 2,3,3,3-tetrafluoropropene as the major monomer unit exhibits high intrinsic $CO_2/CH_4$ and $H_2/CH_4$ selectivity, as disclosed in U.S. application Ser. No. 13/679,251, which is incorporated herein by reference.

It is expected that the asymmetric integrally skinned membranes and thin film composite (TFC) membranes made of 1234yf/VDF or 1234ze/VDF copolymers of the present invention would further improve the performance in selective gas separations.

As used herein, the singular forms "a", "an" and "the" include plural unless the context clearly dictates otherwise. Moreover, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A membrane consisting of a copolymer having units based on vinylidene fluoride ("VDF") monomer and more than 30 wt % of units based on trans-1,3,3,3-tetrafluoropropene monomer.

2. The membrane of claim 1 wherein said copolymer has more than 50 wt % of units based on trans-1,3,3,3-tetrafluoropropene monomer.

3. The membrane according to claim 1, wherein the membrane is asymmetric integrally skinned.

4. The membrane according to claim 1, wherein the membrane is a thin film composite membrane.

5. The membrane according to claim 1, wherein the membrane has a flat sheet configuration.

6. The membrane according to claim 1, wherein the membrane has a hollow fiber configuration.

7. The membrane according to claim 1, wherein the membrane is a reverse osmosis membrane.

8. The membrane according to claim 1, wherein the membrane is selected from the group consisting of microfiltration membranes, ultrafiltration membranes, and nanofiltration membranes.

9. The membrane according to claim 1, wherein the membrane is a pervaporation membrane.

10. The membrane according to claim 1, wherein the membrane is a distillation membrane.

11. The membrane according to claim 1, wherein the membrane is porous.

* * * * *